(12) United States Patent
Ding et al.

(10) Patent No.: US 10,914,970 B2
(45) Date of Patent: Feb. 9, 2021

(54) BROADBAND TUNABLE THZ WAVE MANIPULATOR AND THE METHOD TO FORM THE SAME

(71) Applicant: Agency for Science, Technology and Research, Singapore (SG)

(72) Inventors: Lu Ding, Singapore (SG); Jinghua Teng, Singapore (SG)

(73) Assignee: Agency for Science, Technology and Research, Singapore (SG)

(*) Notice: Subject to any disclaimer, the term of this patent is extended or adjusted under 35 U.S.C. 154(b) by 164 days.

(21) Appl. No.: 16/040,726

(22) Filed: Jul. 20, 2018

(65) Prior Publication Data

US 2019/0025613 A1    Jan. 24, 2019

(30) Foreign Application Priority Data

Jul. 21, 2017 (SG) .............................. 10201705998S (51) Int. Cl.
| | | |
|---|---|---|
| *G02F 1/017* | (2006.01) | |
| *G02F 1/025* | (2006.01) | |
| *G02F 1/015* | (2006.01) | |
| *G02B 1/00* | (2006.01) | |

(52) U.S. Cl.
CPC .............. *G02F 1/017* (2013.01); *G02F 1/015* (2013.01); *G02F 1/025* (2013.01); *G02B 1/002* (2013.01); *G02F 2202/10* (2013.01); *G02F 2203/13* (2013.01)

(58) Field of Classification Search
CPC .......... G02F 1/017; G02F 1/015; G02F 1/025; G02F 2202/10; G02F 2203/13; G02B 1/002; G02B 1/11
See application file for complete search history.

(56) References Cited

U.S. PATENT DOCUMENTS

| | | | |
|---|---|---|---|
| 9,105,791 B1* | 8/2015 | Dyer ................... | H01L 31/1127 |
| 2010/0079217 A1* | 4/2010 | Morton ................ | H01Q 1/523 |
| | | | 333/24.2 |

(Continued)

OTHER PUBLICATIONS

Reinhard et al., Metamaterial near-field sensor for deep-subwavelength thickness measurements and sensitive refractometry in the terahertz frequency range, May 2012, Applied Physics Letters, vol. 100, Iss. 22, pp. 221101-1-221101-4. (Year: 2012).*

(Continued)

*Primary Examiner* — David P Porta
*Assistant Examiner* — Jeremy S Valentiner
(74) *Attorney, Agent, or Firm* — Winstead PC (57) ABSTRACT

A semiconductor device includes a semiconductor substrate having a metasurface layer configured with multiple pairs of finger portions in a repeating arrangement. The multiple pairs of finger portions are electrically configurable to modulate a radiation signal received by the semiconductor device. Each pair of finger portions includes first and second members where the first member is doped with a first dopant and the second member is doped with a second dopant being different to the first dopant. Any two adjacent first or second members are configured to be separated by at least deep subwavelength to enable the repeating arrangement.

15 Claims, 6 Drawing Sheets

(56) References Cited

U.S. PATENT DOCUMENTS

| | | | | |
|---|---|---|---|---|
| 2014/0048710 A1* | 2/2014 | Xu | .................... | H01Q 15/0053 |
| | | | | 250/341.1 |
| 2014/0061469 A1* | 3/2014 | Hwang | .................... | G01J 5/28 |
| | | | | 250/338.4 |
| 2015/0276489 A1* | 10/2015 | Cumming | ............... | G01J 5/024 |
| | | | | 250/338.3 |

OTHER PUBLICATIONS

Rahm, M., et al., "THz wave modulators: a brief review on different modulation techniques," Journal of Infrared, Millimeter, and Terahertz Waves, vol. 34, 2013, pp. 1-27.

Libon, I. H., et al., "An optically controllable terahertz filter," Applied Physics Letters, vol. 76, No. 20, May 15, 2000, pp. 2821-2823.

Chowdhury, D. R., et al., "Dynamically reconfigurable terahertz metamaterial through photo-doped semiconductor," Applied Physics Letters, vol. 99, 2011, pp. 231101-1-231101-3.

Kleine-Ostmann, T., et al., "Room-temperature operation of an electrically driven terahertz modulator," Applied Physics Letters, vol. 84, No. 18, May 3, 2004, pp. 3555-3557.

Chen, H-T., et al., "A metamaterial solid-state terahertz phase modulator," Nature Photonics, vol. 3, Feb. 22, 2009, pp. 148-151.

Lee, S. H., et al., "Switching terahertz waves with gate-controlled active graphene metamaterials," Nature Materials, vol. 11, Sep. 30, 2012, pp. 936-941.

Ding, L., et al., "Polarization independent broadband terahertz antireflection by deep-subwavelength thin metallic mesh," Laser & Photonics Reviews, vol. 8, No. 6, 2014, pp. 941-945.

\* cited by examiner

BROADBAND TUNABLE THZ WAVE MANIPULATOR AND THE METHOD TO FORM THE SAME

CROSS-REFERENCE TO RELATED APPLICATION

This application claims the benefit of Singapore Patent Application No. 10201705998S, entitled "A broadband tunable THz wave manipulator and the method to form the same" and filed on Jul. 21, 2017, which is expressly incorporated by reference herein in its entirety.

TECHNICAL FIELD

The present disclosure relates to a semiconductor structure for broadband active Terahertz (THz) manipulation. More specifically, the disclosure relates to a semiconductor structure for broadband active THz manipulation with full CMOS compatible and electrically controlled THz wave manipulation.

History of Related Art

Generally, THz radiation refers to electromagnetic waves of frequencies from 0.1 to 10 THz, or wavelengths from 3 mm to 30 μm. It locates in between microwave and infrared in the electromagnetic spectrum, and it shares some properties with each of these. Due to the unique properties of THz radiation, it has various applications in medical imaging, security, bioscience, imaging, communication, manufacturing, and power generation, etc. In all proposed applications, reliable and versatile THz measurement systems require adequate optical components, e.g. adaptive lenses, filters, switchable mirrors, spatial light modulators, dynamic polarization controllers or amplitude and phase modulators, for active and adaptive control of the electromagnetic properties of the radiation. While modulators are well established in the optical realm, the THz frequency regime is still in great demand for highly efficient, fast and versatile active light modulators.

The THz wave manipulation can be realized via the tuning of the dielectric function of the media it interact with, e.g. by optical, electronic, or thermal tuning, etc. All-optical modulation has been reported in semiconductor and metamaterials, which requires introducing a pumping lasers and delicate optical alignment. Electronic modulation is the most attractive approach with a view toward applications and integration. THz electronic modulator based on GaAs/AlGaAs high electron mobility transistor, doped semiconductor/metamaterial devices and graphene based devices have been demonstrated. All these devices showed narrow bandwidth but are CMOS incompatible. As a fully CMOS compatible is highly desired, those skilled in the art are striving to provide a CMOS compatible modulator with broadband THz capabilities.

SUMMARY

The above and other problems are solved and an advance in the state of the art is made by systems and methods provided by embodiments in accordance with the disclosure. The first advantage of embodiments of systems and methods in accordance with the disclosure is that systems and methods provide flexibility for any broadband THz amplitude and phase manipulation and can be used as THz amplitude and phase modulator, anti-reflector, attenuator, phase shifter, etc. The second advantage of embodiments of systems and methods in accordance with the disclosure is that the fabrication process is fully CMOS compatible and suitable for large area mass production. Further, the systems and methods in accordance with the disclosure have the advantages of compact, easy integration, low cost, and room temperature operation.

A first aspect of the disclosure relates to a semiconductor device comprising a semiconductor substrate having a metasurface layer configured with a plurality of pairs of finger portions in a repeating arrangement. The pairs of finger portions are electrically configurable to modulate a radiation signal received by the semiconductor device. Each pair of finger portions comprises first and second members wherein the first member is doped with a first dopant and the second member is doped with a second dopant being different to the first dopant. Any two adjacent first or second members are configured to be separated by at least deep subwavelength to enable the repeating arrangement.

In an embodiment of the first aspect of the disclosure, the repeating arrangement is periodic. In another embodiment, the repeating arrangement is aperiodic.

In an embodiment of the first aspect of the disclosure, the semiconductor substrate includes being formed from a silicon-based material. Preferably, the silicon-based material includes high-resistivity silicon.

In an embodiment of the first aspect of the disclosure, the radiation signal includes a Terahertz (THz) radiation signal, a near-infrared signal, or a mid-infrared signal.

In an embodiment of the first aspect of the disclosure, the first dopant is a p-type dopant and the second dopant is an n-type dopant.

In an embodiment of the first aspect of the disclosure, the first and second members are each configured to have a maximum width of half of the deep subwavelength.

In an embodiment of the first aspect of the disclosure, the first members of the plurality of pairs of finger portions are arranged to be coupled to a first ohmic contact which is doped with the first dopant, and the second members of the plurality of pairs of finger portions are arranged to be coupled to a second ohmic contact which is doped with the second dopant. The first and second ohmic contacts are further coupled to respective electrodes, which are electrically connectable to a voltage source to operate the device. In this embodiment, the first ohmic contact is a highly doped of the first dopant and the second ohmic contact is a highly doped of the second dopant. In this embodiment, the electrodes are made of aluminium with titanium acting as an adhesion layer between the electrodes and the ohmic contacts.

In an embodiment of the first aspect of the disclosure, the first and second members of each pair of finger portions are arranged to be coupled to respective ohmic contacts, the respective ohmic contacts of the plurality of pairs of finger portions further coupled to respective electrodes, which are electrically connectable to respective voltage sources to operate the device. In this embodiment, the respective ohmic contacts are highly doped of the respective dopants. In this embodiment, the electrodes are made of aluminium with titanium acting as an adhesion layer between the electrodes and the ohmic contacts.

In an embodiment of the first aspect of the disclosure, the metasurface layer includes being arranged to have a substantially flat surface.

A second aspect of the disclosure relates to a method of modulating a radiation signal using a semiconductor device. The semiconductor device includes a semiconductor substrate having a metasurface layer configured with a plurality of pairs of finger portions in a periodic or aperiodic repeating arrangement. Each pair of finger portions comprises first and second members. The first member is doped with a first dopant and the second member is doped with a second dopant being different to the first dopant. Any two adjacent first or second members are configured to be separated by at least deep subwavelength to enable the periodic or aperiodic repeating arrangement. The method comprises receiving the signal by the device, and electrically configuring the plurality of pairs of finger portions to modulate the received signal.

BRIEF DESCRIPTION OF THE DRAWINGS

The above advantages and features in accordance with this invention are described in the following detailed description and are shown in the following drawings:

FIG. 1b illustrates a magnified of the box identified in FIG. 1a;

FIG. 1c illustrates a cross sectional view of the portion of the doped area along the line H-H as shown in FIG. 1a;

DESCRIPTION

The present disclosure relates to a semiconductor structure for broadband active Terahertz (THz) manipulation. More specifically, the disclosure relates to a semiconductor structure for broadband active THz manipulation with full CMOS compatible and electrically controlled THz wave manipulation.

This disclosure discloses a fully CMOS-compatible and electrically controlled metasurface device that can actively manipulate the amplitude and phase of THz radiation over a broad frequency span. The device according to this disclosure can also be used in light manipulation in other frequency range, e.g. near infrared (NIR) and mid-IR (MIR).

The CMOS compatible electrically controlled broadband THz wave manipulator in accordance with this disclosure is a semiconductor device comprising a semiconductor substrate having a metasurface layer configured with multiple pairs of finger portions in a periodic or aperiodic repeating arrangement. The multiple pairs of finger portions are electrically configurable to modulate a radiation signal received by the semiconductor device. Each pair of finger portions comprises a first member and a second member. The first member is doped with a first dopant and the second member is doped with a second dopant which is different to the first dopant. Any two adjacent first or second members are configured to be separated by at least deep subwavelength to enable the periodic or aperiodic repeating arrangement. The first and second members are connected to first and second metal electrodes which are electrically connectable to a voltage source V to operate the semiconductor device. The semiconductor device as shown in FIGS. 1a-1c illustrates a periodic repeating arrangement.

Figure 1A:
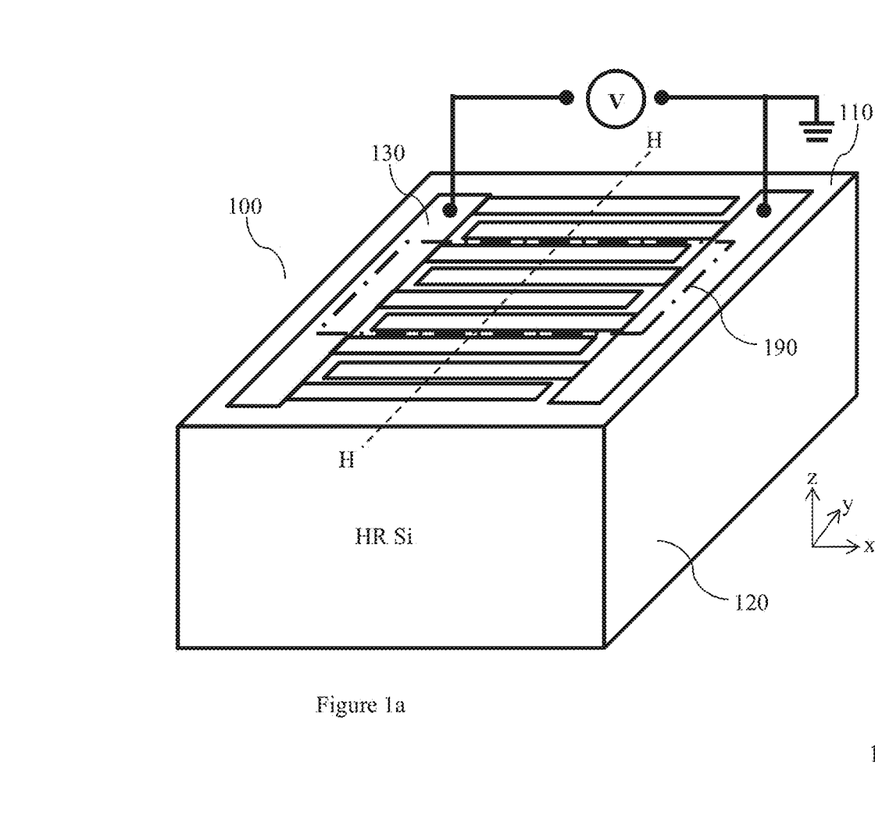
FIG. 1a illustrates a schematic of a full CMOS compatible electrically controlled broadband THz wave manipulator.
Figure 1B:
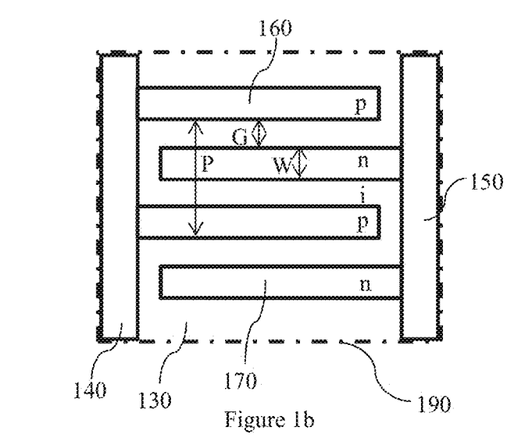
Figure 1C:
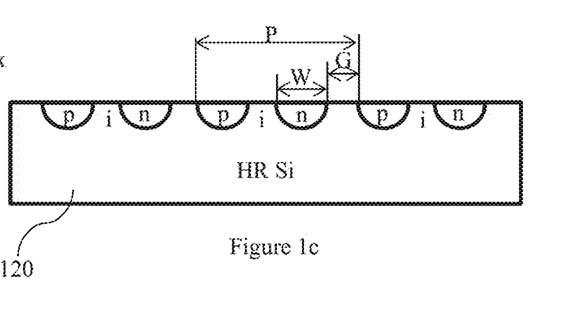

FIG. 1a illustrates a schematic of a full CMOS compatible electrically controlled broadband THz wave manipulator in accordance with this disclosure. FIG. 1b illustrates the magnified portion of doped surface shown by box 190. FIG. 1c illustrates the cross sectional view of a portion of the doped area identified by the line H-H.

As shown in FIG. 1a, the semiconductor device 100 is composed of a series of finger structures of p-i-n or p-n diodes, namely, alternative p-doped and n-doped Si stripes with one dimensional periodicity spreading out to cover the entire surface 110 of the high-resistivity Si substrate 120. Specifically, the semiconductor device 100 comprises a semiconductor substrate 120 which is high-resistivity silicon substrate. The semiconductor substrate 120 has a metasurface layer 130 configured with multiple pairs of finger portions in a periodic repeating arrangement. The metasurface layer 130 is being arranged on a substantially flat surface of the semiconductor substrate 120. The multiple pairs of finger portions are electrically configurable to modulate a radiation signal received by the semiconductor device 100. Each pair of finger portions comprises a first member 160 and a second member 170. In this example, the first member is doped with a p-doped Si stripe and the second member is doped with an n-doped Si stripe. An undoped intrinsic region is formed between the first and second members.

As mentioned above, the two adjacent pairs of finger portions are configured to be separated by at least deep subwavelength to enable the periodic or aperiodic repeating arrangement. In this example, the one dimensional period P is counted from one p-doped (or n-doped, alternatively) Si stripe to the one next, as shown in FIG. 1b and FIG. 1c. The one dimensional period P is defined to be deep subwavelength. Hence, the two adjacent pairs of finger portions are configured to be separated by length G so that the one dimensional period P is a deep subwavelength to enable the periodic repeating arrangement.

For purposes of this disclosure, the space between any two adjacent finger portions together with the two finger portions may logically be viewed as one unit. When the length of a unit is a constant, the whole structure is periodic. But when the length of a unit is a non-constant, the whole structure is then considered aperiodic. Alternatively, if G is a constant, the whole structure is periodic, and if G is non-constant, the whole structure is considered aperiodic. In another embodiment, aperiodic may be configured with width W of the p-doped and n-doped Si stripe being not constant while P is constant. In short, periodic equate to P which is kept constant. Aperiodic may be configured with P, W, and G being not constant in any combinations.

The width W of the individual p-doped Si stripe is identical to that of the n-doped one, which is designed no greater than half of one dimensional period (i.e. P/2). It should be noted that the width of each of the first and second members need not always be ≤P/2, P being the deep sub-wavelength. This means that G is zero when the width of the first and second members is P/2. One skilled in the art will recognise that the width W may take on other suitable values as well. However, overlapping between p-type and n-type region is generally not recommended. It is highlighted that the first and second members may have different width, in which the summation can be P or less than P. In short, the summation of the width of the first and second members and the length G is equal to P and can be expressed in the following expression, $$P=W_1+W_2+G$$

Where $W_1$ is the width of the first member, $W_2$ is the width of the second member, and G is the gap separating two adjacent pairs of finger portions.

The p-type and n-type doping is realized by ion-implantation. The penetration depth of the ion implantation is about tens of nanometers to micron, which is much smaller than the THz wavelength. FIG. 1c illustrates the cross-sectional view of a portion of the doped area along the line H-H. All p-doped Si stripes are connected by a highly doped p++ area 140 which connects to a first metal electrode at one side of the Si chip forming the first member 160, while all n-doped ones are connected to another highly doped n++ area 150 which connects to a second metal electrode at the opposite side forming the second member 170. In other words, the first member 160 includes a number of a first dopant stripes connected with a highly doped of first dopant area 140 which connects to the first metal electrode and the second member 170 comprises a number of a second dopant stripes connected with a highly doped of the second dopant area 150 which connects to the second metal electrode. More specifically and based on that shown in FIGS. 1a-1c, the first member 160 includes a number of p-doped Si stripes connected with a highly doped P++ area 140 which connects to the first metal electrode and the second member 170 comprises a number of n-doped Si stripes connected with a highly doped N++ area 150 which connects to the second metal electrode. The highly doped P++ area 140 and highly doped N++ area 150 are essentially the ohmic contacts of the first and second members 160 and 170.

The first and second metal electrodes are electrically connectable to a voltage source V to operate the semiconductor device 100. For compatible reason, the first and second metal electrodes are preferably Aluminium (Al) with Titanium (Ti) acting as an adhesion layer between the electrodes and the ohmic contacts.

The fabrication process is fully CMOS compatible. It starts with a high-resistivity silicon wafer, followed with four different implantations of p, n, p++, and n++ to form the p-i-n or p-n diodes and the Ohmic contacts, respectively. Cladding oxide is deposited followed with contact hole opening, and contact metal formation. Finally, in order to minimize the transmission loss, the cladding oxide is removed in the doping area to form a transmission window.

Figure 2A:
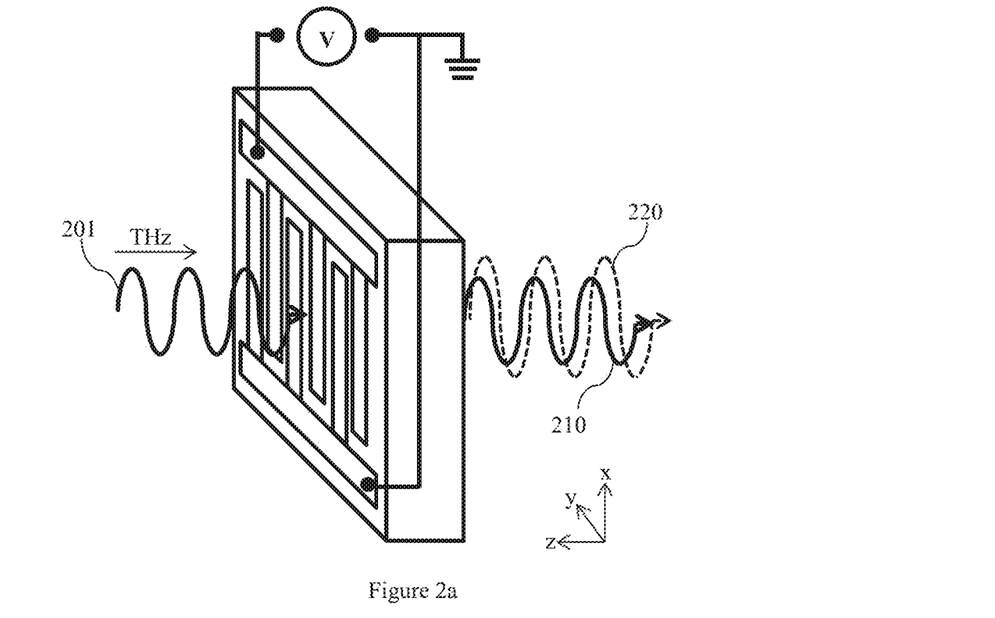
FIG. 2a illustrates an experiment configuration for THz TDS measurement.
Figure 2B:
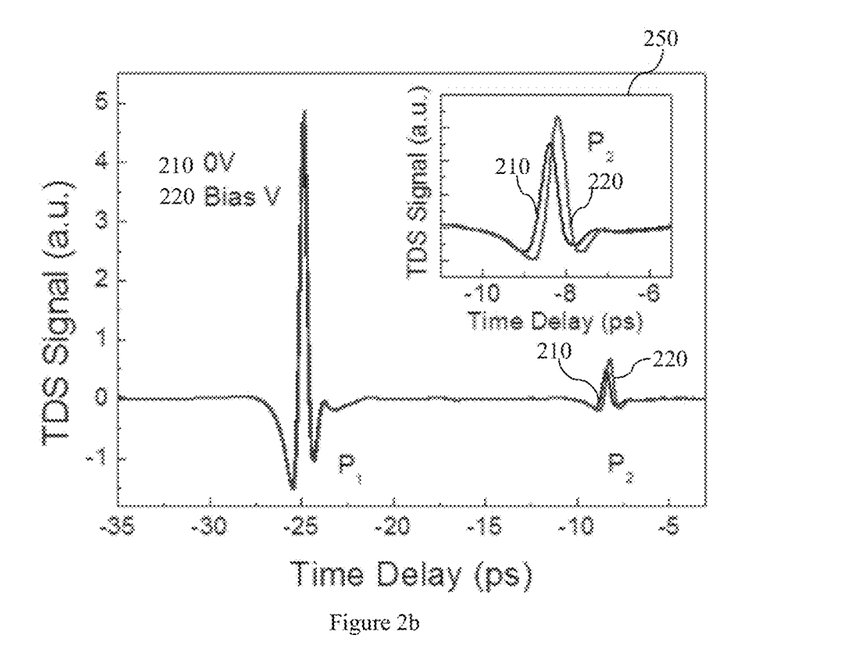
FIG. 2b illustrates the TDS spectra with/without bias voltage.
Figure 2C:
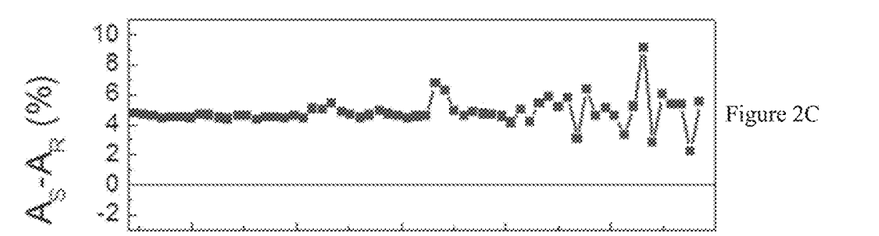
FIG. 2c illustrates the relative amplitude of the main transmission peak P1 at bias voltage with respect to zero bias.
Figure 2D:
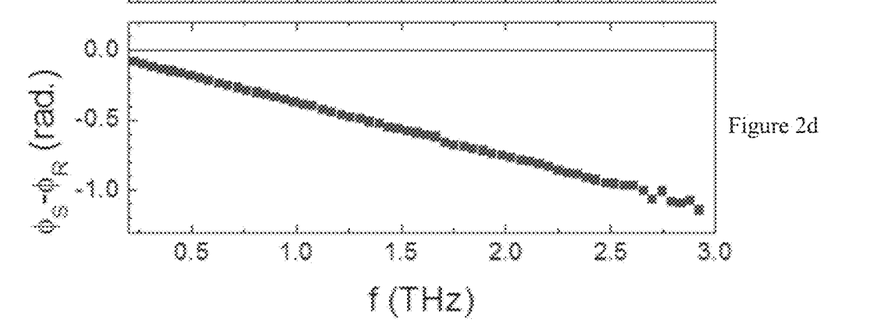
FIG. 2d illustrates the relative phase spectra of the main transmission peak P1 at bias voltage with respect to zero bias.

The semiconductor device 100 is characterized by THz time domain spectroscopy (TDS). FIGS. 2a-2d illustrate the results. In particular, FIG. 2a illustrates the experiment configuration for THz TDS measurement; FIG. 2b illustrates the TDS spectra with/without bias voltage while FIGS. 2c and 2d illustrate the amplitude and phase spectra of the main transmission peak P1 with respect to zero bias. The semiconductor device 100 is oriented to be transverse electric (TE) polarized, along x direction as shown in FIGS. 1a-1c and 2a, of which the polarization of THz incident wave 201 is perpendicular to the metasurface layer 130 of the semiconductor device 100. The TDS spectrum is recorded at a bias voltage (illustrated by line 220) as well as zero bias (illustrated by line 210), as plotted in FIG. 2b. P1 is the main transmission peak while P2 is the first echo transmission gone through one round trip of internal reflection in the silicon substrate. The inset 250 shows zoom-in spectra of P2. At a glance, it shows that both amplitude and time delay of P2 are modulated by supplying an applied voltage to the p-i-n diode. It indicates that both amplitude and phase of P1 are modulated.

The modulated relative amplitude and phase spectra of the main transmission peak P1 with respect to zero bias are shown in FIGS. 2c and 2d respectively. The transmission modulation shows a broadband feature. The bandwidth cannot be fully explored due to the limited TDS frequency span. The phase modulation increases linearly with frequency.

Figure 3:
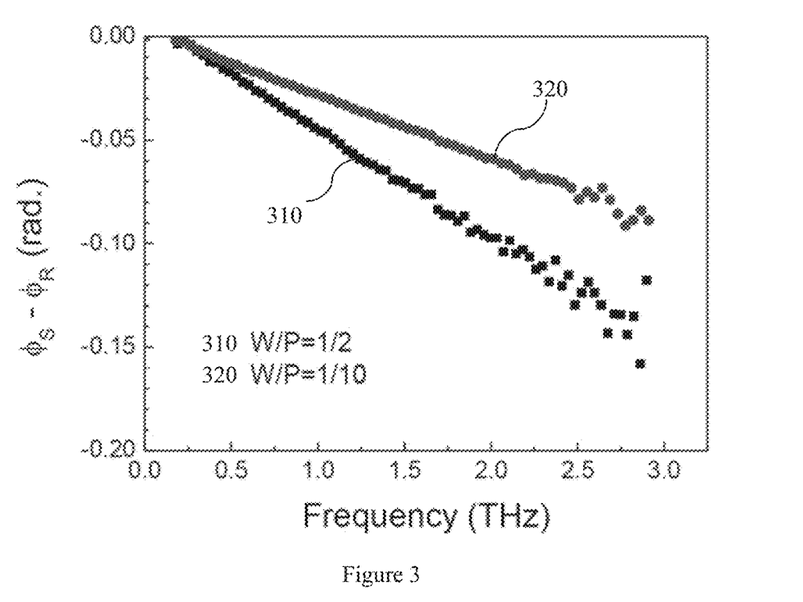
FIG. 3 illustrates the phase tuning properties of metasurface layer in which the W/P ratio of the p- and n-doped Si strips are 1/10 and 1/2.

The phase modulation depth can also be controlled by varying the W/P ratio of the p-doped and n-doped Si strips. FIG. 3 shows the phase tuning properties of semiconductor device 100 in which the W/P ratio of the p-doped and n-doped Si strips are 1/10 and 1/2. The semiconductor device 100 with W/P=1/10 introduces larger phase shift than those with W/P=1/2 under the same bias voltage.

Figure 4:
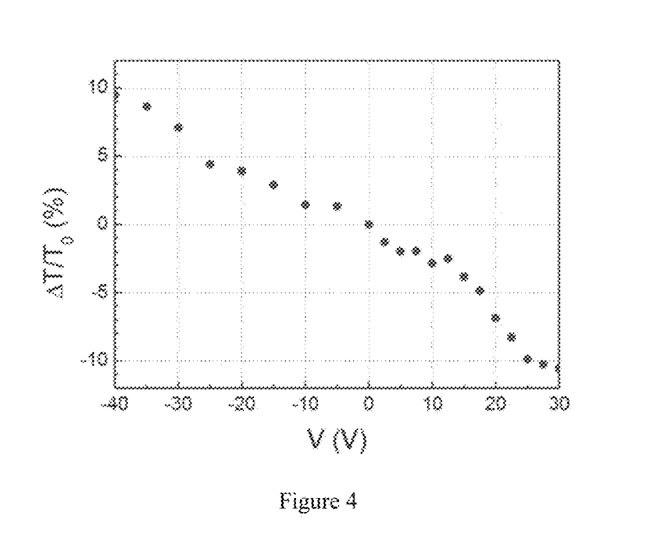
FIG. 4 illustrates the change of THz pulse transmission amplitude at various forward and reverse bias normalized to that at 0V bias.
Figure 5:
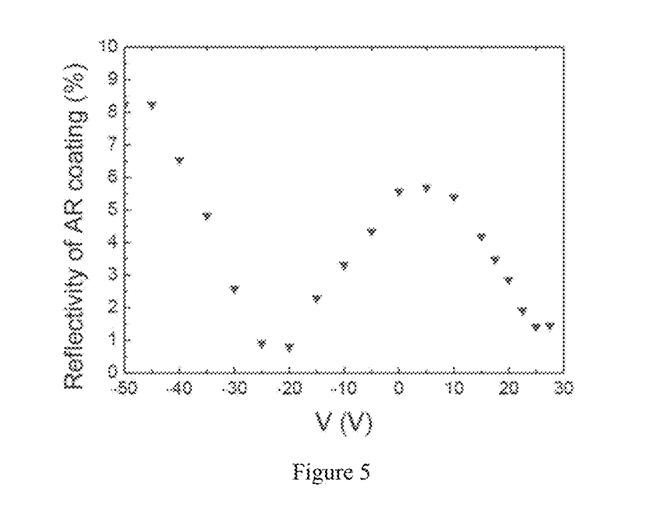
FIG. 5 illustrates the absolute value of reflectivity of AR coating at various forward and reverse bias.

Tests have been conducted on semiconductor device 100 fabricated in different dimensions of the metasurface layer 130 but based on the same structure and principle. The modulation depth of the transmitted THz signal can be continuously tuned up to 20%. FIG. 4 illustrates THz pulse transmission amplitude at various forward and reverse bias normalized to that at 0V bias. The unit modulation depth is 0.286%/V. FIG. 5 plots the absolute value of reflectivity of anti-reflective (AR) coating at various forward and reverse biases. The absolute value of reflectivity can be tuned from 10% all the way to about 0%, which means we can find 100% anti-reflection by sweeping the voltage after the structure fabrication, which is impossible for any other AR coating technology reported so far.

Figure 6:
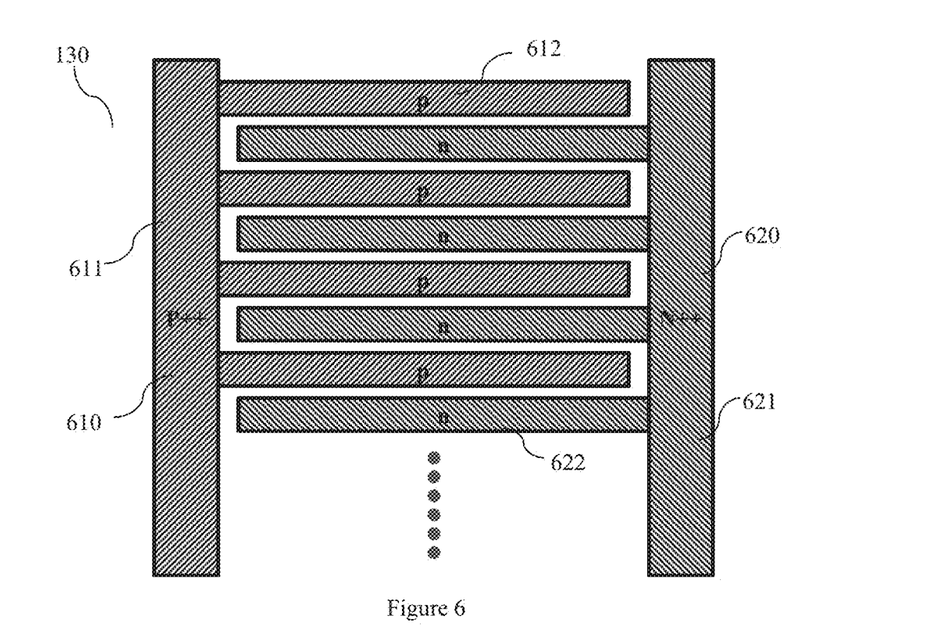
FIG. 6 illustrates a first embodiment of the metasurface layer.
Figure 7:
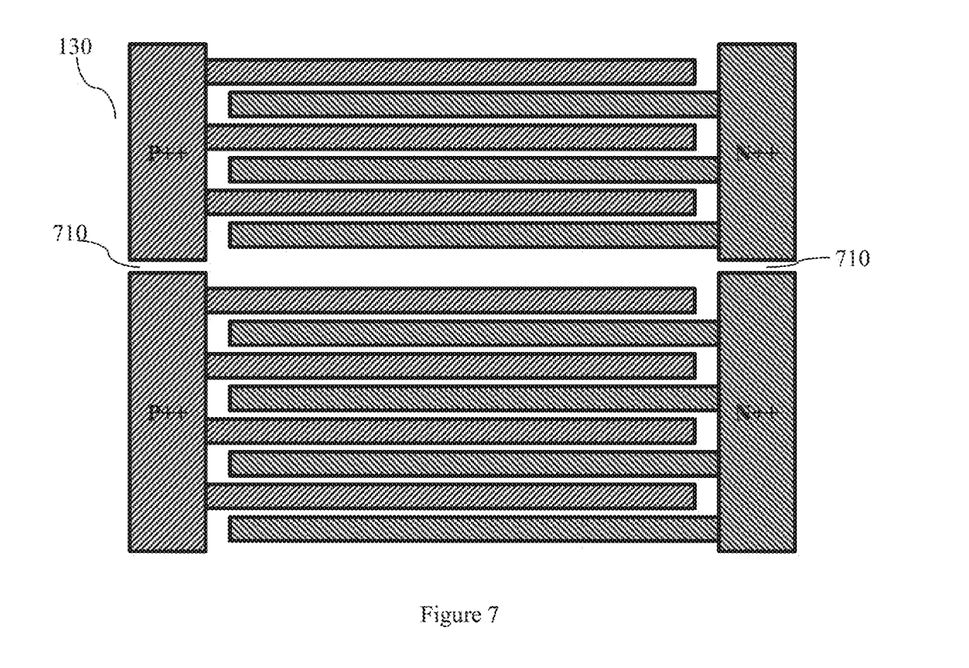
FIG. 7 illustrates a second embodiment of the metasurface layer with multi-section p++ and n++ region for multi-section independent electrical control to get more versatile tuning.
Figure 8:
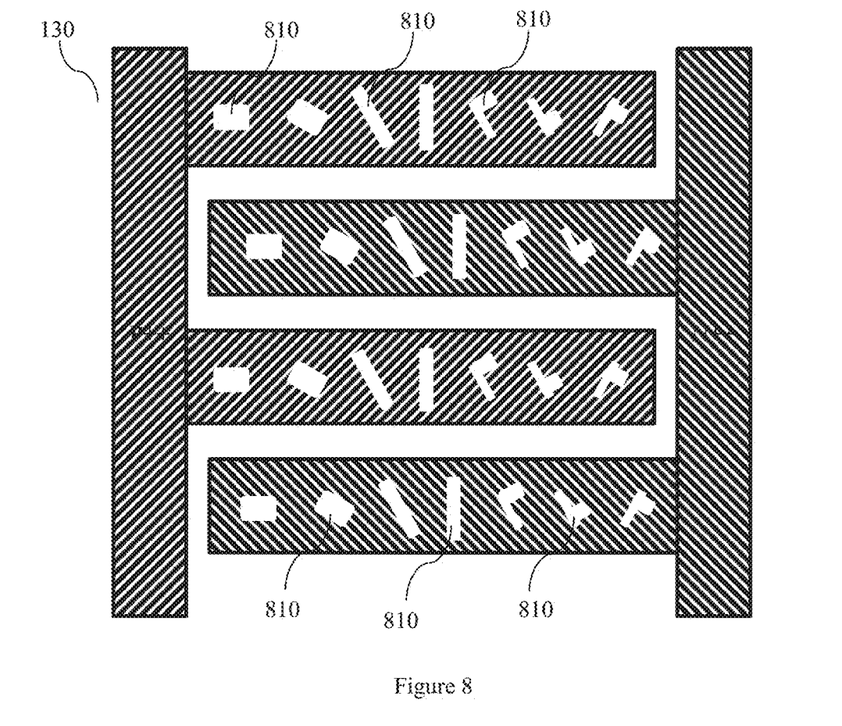
FIG. 8 illustrates a third embodiment of the metasurface layer with deep subwavelength antennas for various functionalities.

The base design of the semiconductor device 100 shown in FIGS. 1a-1c can be extended to some variations. FIGS. 6-8 illustrate some embodiments of the semiconductor device 100 according to this disclosure.

FIG. 6 illustrates a first embodiment of a metasurface layer 130 of the semiconductor device 100. Specifically, the first member 610 of the metasurface layer 130 comprises a number of p-doped Si stripes 612 connected with a highly doped P++ area 611 which connects to the first metal electrode. The second member 620 comprises a number of n-doped Si stripes 622 connected with a highly doped N++ area 621 which connects to the second metal electrode. The highly doped P++ area 611 and highly doped N++ area 621 are essentially the ohmic contacts of the first and second members 610 and 620. The p-doped Si stripes 612 and n-doped Si stripes 622 are repeated along the length of the highly doped P++ area 611 and highly doped N++ area 621. Each adjacent p-doped Si stripe and n-doped Si stripe forms a finger portion. Hence, multiple finger portions are provided with the repeated p-doped Si stripes 612 and n-doped Si stripes 622 along the length of the highly doped P++ area 611 and highly doped N++ area 621. The first and second metal electrodes are electrically connectable to a voltage source V to operate the semiconductor device 100. For compatible reason, the first and second metal electrodes are preferably Aluminium (Al) with Titanium (Ti) acting as an adhesion layer between the electrodes and the ohmic contacts.

FIG. 7 illustrates a second embodiment of a metasurface layer 130 of the semiconductor device 100. In this embodiment, the metasurface layer 130 includes multi-section p++ and n++ region for multi-section independent electrical control to get more versatile tuning. The most versatile structure is to have individual control of every p-n junction, or to separate every certain numbers of p-n junctions to create only several sections, with lower resolutions, e.g. for just 3 or 4 sections by adding in the separation/isolations 710. In short, the first metasurface layer 130 as shown in FIG. 6 is divided by separation/isolations 710 along the highly doped P++ area 611 and highly doped N++ area 621. By doing this, we can create a refractive index gradient on the surface, which could do beam steering, which is very important and interesting, especially in near IR.

FIG. 8 illustrates a third embodiment of a metasurface layer 130 of the semiconductor device 100. In this embodiment, the metasurface layer 130 includes deep subwavelength antennas 810 (unshaded shapes) for various functionalities and device applications. Specifically, a series of antennas 810 with deep subwavelength features, designed for phase or amplitude control, are provided on the p-doped Si stripes 612 and n-doped Si stripes 622. The antennas 810 are connected to the first and second metal electrodes via the highly doped P++ area 611 and highly doped N++ area 621.

The semiconductor device 100 according to this disclosure is suitable for any broadband THz amplitude and phase manipulation and can be used as THz amplitude and phase modulator, anti-reflector, attenuator, phase shifter, etc. The fabrication process is fully CMOS compatible and suitable for large area mass production. The semiconductor device 100 has the advantages of compact, easy integration, low cost, and room temperature operation. The electrical control enables compact, flexible, and high speed device design and operation compared to other methods.

It should be noted that the results shown in FIGS. 2c-2d and 3 are limited by the available THz TDS setup. Hence, the semiconductor device 100 is not limited to 0-3 THz.

The first and second members have no overlap with electrodes which greatly increases the effective area and releases the fabrication limitation on metal coverage. The semiconductor device 100 is flat with no physical structure on the surface. By physically separating the electrode and effective area, it allows us to add on more pairs of finger portions to manipulate the EM wave. Electrodes can be partitioned to have sectional control over the whole device. As a flat device, it can also be used as a platform for tuning the properties for 2D materials.

There will be changes to the performance of the semiconductor device 100 with different doping levels and dopant profiles. Doping level determines the free carrier concentration in the doped layer which is reflected in the dielectric function of material. In the semiconductor device 100 according to this disclosure, the carrier concentration is responsive to THz wave and can be tuned continuously to produce a flat and tunable device. The carrier concentration can be passively tuned or actively tuned. Specifically, the passive tuning of carrier concentration is realized by ion implantation with different doping levels and dopant profiles, and the active tuning of carrier concentration is realized by applying bias voltage.

In use, the semiconductor device 100 first receives a signal such as the THz incident wave. The signal may also include a THz radiation signal, a near-infrared signal, or a mid-infrared signal. By way of electrically configuring the multiple of pairs of finger portions, the semiconductor device 100 modulate the received signal accordingly. As mentioned above with reference to FIGS. 7 and 8, multiple of pairs of finger portions, each having different variations of the first and second members, can be provided on a semiconductor device 100. Hence, it is possible to select a desired pair of finger portions to modulate the signal accordingly. For example, multiple of pairs of finger portions may be separated by separation/isolations 710 and a user may select one pair of finger portion at one time to perform the required modulation. Further, the different configuration may be introduced in each pair of finger portion. For example, each finger portion may have different doping levels and dopant profiles or different variation of P, W, and G to provide a variety of functionalities and applications.

While the invention has been illustrated and described in detail in the drawings and foregoing description, such illustration and description are to be considered illustrative or exemplary, and not restrictive; the invention is not limited to the disclosed embodiments. Other variations to the disclosed embodiments can be understood and effected by those skilled in the art in practising the claimed invention.

The invention claimed is:

1. A semiconductor device comprising:
a semiconductor substrate having a metasurface layer configured with a plurality of pairs of finger portions in a repeating arrangement, and are electrically configurable to modulate a radiation signal received by the semiconductor device;
wherein each pair of finger portions comprises first and second members, the first member doped with a first dopant and the second member doped with a second dopant being different to the first dopant; and
wherein two adjacent first members form a unit with a length of the unit no greater than at least one of Terahertz wavelength, near-infrared wavelength and mid-infrared wavelength to enable the repeating arrangement.

2. The semiconductor device according to claim 1, wherein the repeating arrangement is periodic.

3. The semiconductor device according to claim 1, wherein the repeating arrangement is aperiodic.

4. The semiconductor device according to claim 1, wherein the semiconductor substrate includes being formed from a silicon-based material.

5. The semiconductor device according to claim 4, wherein the silicon-based material is undoped.

6. The semiconductor device according to claim 1, wherein the radiation signal includes a Terahertz (THz) radiation signal, a near-infrared signal, or a mid-infrared signal.

7. The semiconductor device according to claim 1, wherein the first dopant is a p-type dopant and the second dopant is an n-type dopant.

8. The semiconductor device according to claim 1, wherein the first and second members are each configured to have a maximum width of half of at least one of Terahertz wavelength, near-infrared wavelength and mid-infrared wavelength.

9. The semiconductor device according to claim 1, wherein;
the first members of the plurality of pairs of finger portions are arranged to be coupled to a first ohmic contact which is doped with the first dopant, and the second members of the plurality of pairs of finger portions are arranged to be coupled to a second ohmic contact which is doped with the second dopant; and the first and second ohmic contacts further coupled to respective electrodes, which are electrically connectable to a voltage source to operate the device.

10. The semiconductor device according to claim 9, wherein the first ohmic contact is P++ and the second ohmic contact is N++.

11. The semiconductor device according to claim 9, wherein the electrodes are made of aluminium with titanium acting as an adhesion layer between the electrodes and the ohmic contacts.

12. The semiconductor device according to claim 1, wherein the first and second members of each pair of finger portions are arranged to be coupled to respective ohmic contacts, the respective ohmic contacts of the plurality of pairs of finger portions further coupled to respective electrodes, which are electrically connectable to respective voltage sources to operate the device.

13. The semiconductor device according to claim 1, wherein the metasurface layer includes being arranged to have a substantially flat surface.

14. The semiconductor device according to claim 1, wherein an undoped intrinsic region is formed between the first and second members of each pair of finger portions.

15. A method of modulating a radiation signal using a semiconductor device, the semiconductor device comprising a semiconductor substrate having a metasurface layer configured with a plurality of pairs of finger portions in a periodic or aperiodic repeating arrangement, each pair of finger portions comprises first and second members, the first member doped with a first dopant and the second member doped with a second dopant being different to the first dopant, and any two adjacent first members form a unit with a length of the unit no greater than at least one of Terahertz wavelength, near-infrared wavelength and mid-infrared wavelength to enable the periodic or aperiodic repeating arrangement, the method comprising:

receiving the signal by the device; and electrically configuring the plurality of pairs of finger portions to modulate the received signal.

* * * * *